United States Patent
Tretter

Patent Number: 5,798,846
Date of Patent: Aug. 25, 1998

[54] APPARATUS AND METHOD FOR SELECTIVELY PROCESSING A SCANNED IMAGE

[75] Inventor: Daniel R. Tretter, Mountain View, Calif.

[73] Assignee: Hewlett-Packard Company, Palo Alto, Calif.

[21] Appl. No.: 654,492

[22] Filed: May 28, 1996

[51] Int. Cl.$^6$ ............... G06K 9/40; H04N 1/40
[52] U.S. Cl. ............. 358/456; 358/454; 358/533; 382/260; 382/262
[58] Field of Search ............. 358/456, 457, 358/455, 465, 454, 534, 459, 298, 533; 382/299, 218, 219, 262, 260, 256

[56] References Cited

U.S. PATENT DOCUMENTS

| | | | |
|---|---|---|---|
| 4,463,375 | 7/1984 | Macouski | 358/111 |
| 4,513,440 | 4/1985 | Delman | 382/30 |
| 4,613,896 | 9/1986 | Takita | 358/76 |
| 4,682,230 | 7/1987 | Perlman et al. | 358/167 |
| 4,720,745 | 1/1988 | DeForest et al. | 358/166 |
| 4,736,439 | 4/1988 | May | 382/54 |
| 4,786,975 | 11/1988 | Postl | 358/283 |
| 4,812,915 | 3/1989 | Tada | 358/287 |
| 4,893,195 | 1/1990 | Tada | 358/454 |
| 4,926,267 | 5/1990 | Shu et al. | 358/454 |
| 4,928,258 | 5/1990 | May | 364/724.17 |
| 4,939,590 | 7/1990 | Tada | 358/451 |
| 4,942,480 | 7/1990 | Shu | 358/455 |
| 4,965,599 | 10/1990 | Roddy et al. | 346/160 |
| 5,065,255 | 11/1991 | Kimura et al. | 358/447 |
| 5,239,390 | 8/1993 | Tai | 358/458 |
| 5,265,042 | 11/1993 | Smith, Jr. | 364/724.07 |
| 5,313,309 | 5/1994 | Tai et al. | 358/445 |
| 5,333,211 | 7/1994 | Kanda et al. | 382/54 |
| 5,384,865 | 1/1995 | Loveridge | 382/54 |
| 5,408,337 | 4/1995 | Kanda | 358/447 |
| 5,408,338 | 4/1995 | Kolke | 358/448 |
| 5,408,339 | 4/1995 | Sasaki et al. | 358/462 |
| 5,426,670 | 6/1995 | Leppanen et al. | 375/343 |
| 5,528,704 | 6/1996 | Parker et al. | 382/299 |
| 5,579,445 | 11/1996 | Loce et al. | 382/299 |

OTHER PUBLICATIONS

F. W.Campbell and J.J. Kulikowski, "Orientational Selectivity of the Human Visual System" J. Physical, (1966), 187 pp. 437–445.

Yong–Hwan Lee and Sawasd Tantaratana, "Decision–Based Order Statistic Filters", IEEE Transactions on Acoustics, Speech, and Signal Processing, vol. 38, No.3, Mar. 1990, pp. 406–420.

Ruikang Yang, Lin Yin, Moncef Gabbouj, Jaakko Astola, and Yrjo Neuvo, "Optimal Weighted Median Filtering Under Structural Constraints", IEEE Transactions on Signal Processing, vol. 43, No. 3, Mar., 1995, pp. 591–604.

Bing Zeng, Optimal Median Type Filtering Under Structural Constraints, IEE Transactions on Image Processing, vol. 4, No. 7, Jul., 1995, pp. 921–931.

(List continued on next page.)

*Primary Examiner*—Edward L. Coles
*Assistant Examiner*—Madeleine Av Nguyen
*Attorney, Agent, or Firm*—Thomas X. Li

[57] ABSTRACT

An image processing arrangement is described that minimizes moire patterns in scanned halftone images of a scanned image while maintaining the resolution of the scanned image. The arrangement includes a filtering processor that has a modified median filter with a specially shaped (e.g., cross-shaped) filter window. The filter window allows the modified median filter to preserve scanned text images of the scanned image when processing the scanned halftone images to minimize the moire patterns. In addition, the filtering processor determines if an image pixel of the scanned image appears to belong to scanned continuous tone images of the scanned image prior to processing the image pixel. The filtering processor does not process that image pixel and the pixel value of that image pixel is left unchanged if the image pixel appears to belong to the scanned continuous tone images.

20 Claims, 9 Drawing Sheets

OTHER PUBLICATIONS

Neal C. Gallagher, Jr. and Gary L. Wise, "A Theoretical Analysis of the Properties of median Filters", IEEE Transactions on Acoustics, Speech, and Signal Processing, vol. ASSP–29, No. 6, Dec., 1981, pp. 11361141.

Moncef Gabbouj and Edward J. Coyle, "Minimum Mean Absolute Error Stack Filtering with Structural Constraints and Goals", IEEE Transactions on Acoustics, Speech, and Signal Processing, vol. 38, No. 6, Jun., 1990, pp. 955–968.

Ping Wah Wong "Inverse Halftoning and kernel Estimation for Error Diffusion", IEEE Transactions on Image Processing, vol. 4, No. 4, Apr., 1995, pp. 486–498.

Joseph Shou–Pyng Shu and Robert Springer, "Moire Factors and Visibility in Scanned and Printed Halftone Images", Optical Engineering, Jul., 1989, vol. 28, No. 7, pp. 805–812.

Stuart C. HInds, James L. Fisher, and Donald P. D'Amato, "A Document Skew Detection Method Using Run–Length encoding and the Hough Transform", IEE, 1990, pp. 464–468.

Jiang Liu, Chung–Mong Lee and Ren–Ben Shu, "An Efficient Method for the Skew Normalization of a Document Image", IEE, 1992, pp. 122125.

Naoki Ozawa and Kenji Takahashi, "A Corrective coefficient Multipling (CCM) Method for Chrominance Moire Reduction in single–Chip Color Video Cameras", IEE Transaction on Electron Device, vol. 38, No. 5, May, 1991, pp.–12171225.

Arden Steinback and Kwan Y. Wong, "Moire Patterns in Scanned Halftone Pictures", Optical Society of America, vol. 72, No. 9, Sep., 1982, pp. 1190–1198.

HALFTONE IMAGE

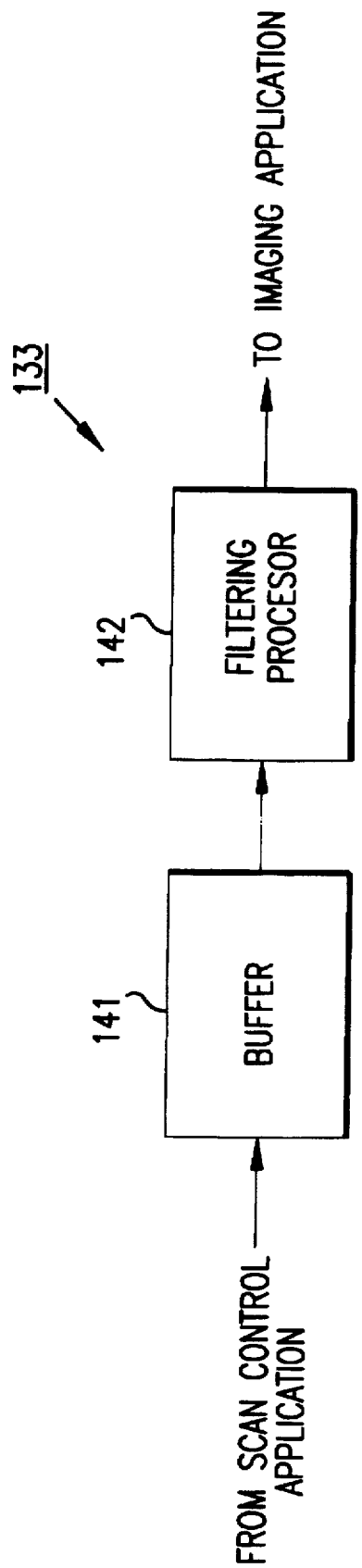

FILTER WINDOW

SCAN LINE DIRECTION ⟶

APPARATUS AND METHOD FOR SELECTIVELY PROCESSING A SCANNED IMAGE

BACKGROUND OF THE INVENTION

1. Field of the Invention

The present invention pertains to image processing. More particularly, this invention relates to an apparatus and a method for selectively processing a scanned image such that (1) moire patterns in scanned halftone images of the scanned image are minimized and (2) the resolution of scanned continuous tone and/or text images is maintained.

2. Description of the Related Art

In the field of digital imaging, halftoning technique can be used to create images (i.e., half toned images or halftone images) with varying levels of grey and color saturation and with varying color shades. Using this technique, patterns of closely spaced tiny dots of ink of the appropriate color, or black, are deposited on paper or other imaging media to achieve the desired halftone image. Halftone images can be created for display on an electronic monitor such as a CRT (Cathode Ray Tube) display or a LCD (Liquid Crystal Display) monitor, or on paper by a printer. The dots are small enough and closely spaced enough to be seen by the human eyes at normal viewing distance as a continuous tone image when, in fact, it is a discontinuous image made up of numerous dots. The varying levels of gray scale or color saturation are achieved by varying the sizes and spacing of the dots appropriately throughout the image, while the varying color shades are produced by superimposing the color and grey scale dots, the relative sizes and spacing of the color and black dots determining the composite shade of color or grey scale level. FIG. 1A shows a typical halftone image 10 that has a section 15 enlarged.

In some applications, it is typically desirable to reproduce a halftone image (e.g., the halftone image 10 of FIG. 1A). One typical approach to reproducing a halftone image is to use an image scanner to scan the halftone image. However, in scanning halftone images (e.g., the halftone image 10 of FIG. 1A), a visible periodic or almost periodic density pattern typically occurs on the scanned halftone image when the relation between the dot pitch, the reading density, and further the periodic characteristics of tone reproduction (i.e., re-halftoning) involves a delicate phase or frequency difference. This periodic density pattern is typically referred to as moire or "beat" pattern. Because the moire or "beat" pattern results from the incorrect reproduction of halftone dots of the original halftone image, it typically renders the scanned halftone image less legible and of poorer visual quality. FIG. 1B shows the scanned image 17 of the halftone image 10 of FIG. 1A. As can be seen from FIG. 1B, moire pattern can be observed on the scanned image 17.

The formation of the moire pattern depends on the following factors: (1) the halftone screen frequency, (2) the scan frequency, (3) the angle between the scan direction and the halftone screen, and (4) the scanner aperture size and shape, etc. For example, as can be seen from FIGS. 1C and 1D, halftone dots 20 and 21 are of the same size before being converted into scan pixel values (i.e., before digitization). After digitization, halftone dot 20 of FIG. 1C consists of one black pixel (i.e., the pixel 20c) and halftone dot 21 consists of two black pixels (i.e., the pixels 21b and 21c). A band of two-pixel dots appears darker than a band of one-pixel dots, thus producing the "beat" pattern or patterns. In the frequency domain, the moire patterns are seen as aliased frequency components resulting from the scanning of screened art. When a scanned halftone image is again half toned for printing, the visibility of moire patterns can be greatly intensified, particularly if a clustered-dot dither matrix or fixed threshold is used for the halftoning.

A number of prior art techniques have been proposed for reducing moire patterns in scanned halftone images. One prior art approach to reducing moire patterns is to process the halftone image with a low pass filter prior to or immediately after scanning the image. The low pass filtering can be done using optical approaches such as increasing the size of the scan aperture (i.e., blurring) or electronic approaches using a digital low pass filter.

Disadvantages are, however, associated with this low pass filtering approach. One disadvantage associated is that while low pass filtering reduces moire patterns, it also degrades the image fidelity. This is due to the fact that low pass filtering degrades the high frequency components of the image. When the filtered halftone image includes both a scanned halftone image and a text and/or continuous tone image, the resultant text and/or continuous tone image is typically undesirably blurred due to the low pass filtering.

SUMMARY OF THE INVENTION

One of the features of the present invention is to minimize moire patterns in a scanned halftone image.

Another feature of the present invention is to maintain the resolution of a scanned continuous tone and/or text image.

A further feature of the present invention is to selectively process a scanned image such that (1) moire patterns in the scanned halftone image portion of the scanned image are minimized and (2) the resolution of the scanned text and continuous tone image portion of the scanned image is maintained.

In accordance with one embodiment of the present invention, a filtering processor is provided to minimize moire patterns in scanned halftone images of a scanned image while maintaining the resolution of scanned text images of the scanned image. The filtering processor is designed to have a modified median filter with a specially shaped (e.g., cross-shaped) filter window that allows the modified median filter to preserve straight lines within the scanned image when processing the scanned halftone images of the scanned image to minimize the moire patterns. In doing so, the filtering processor minimizes the moire patterns in the scanned halftone images of the scanned image without reducing the resolution of the scanned text images of the scanned image.

In addition, the filtering processor also reduces the degradation of scanned continuous tone images in the scanned image when minimizing moire patterns in the scanned halftone images of the scanned image. The filtering processor does this by first determining if an image pixel of the scanned image is similar to its adjacent pixels (i.e., if the image pixel belongs to the scanned continuous tone images). If so, the pixel value of that image pixel is left unchanged because that image pixel does not exhibit the high frequency texture typically associated with a scanned halftone image. If the image pixel is significantly different from at least one of the adjacent pixels, then that image pixel is assumed to be part of a scanned halftone image, and the pixel value is replaced with the output of the modified median filter. By adding this decision stage to the filtering processor prior to the median filtering operation, moire patterns in the scanned halftone images can be minimized while retaining details in the scanned continuous tone images of the scanned image.

Other features and advantages of the present invention will become apparent from the following detailed description, taken in conjunction with the accompanying drawings, illustrating by way of example the principles of the invention.

BRIEF DESCRIPTION OF THE DRAWINGS

FIG. 4 shows in block diagram form the moire reduction module of FIG. 3 that has a buffer and a filtering processor;

DETAILED DESCRIPTION OF THE INVENTION

Figure 1A:
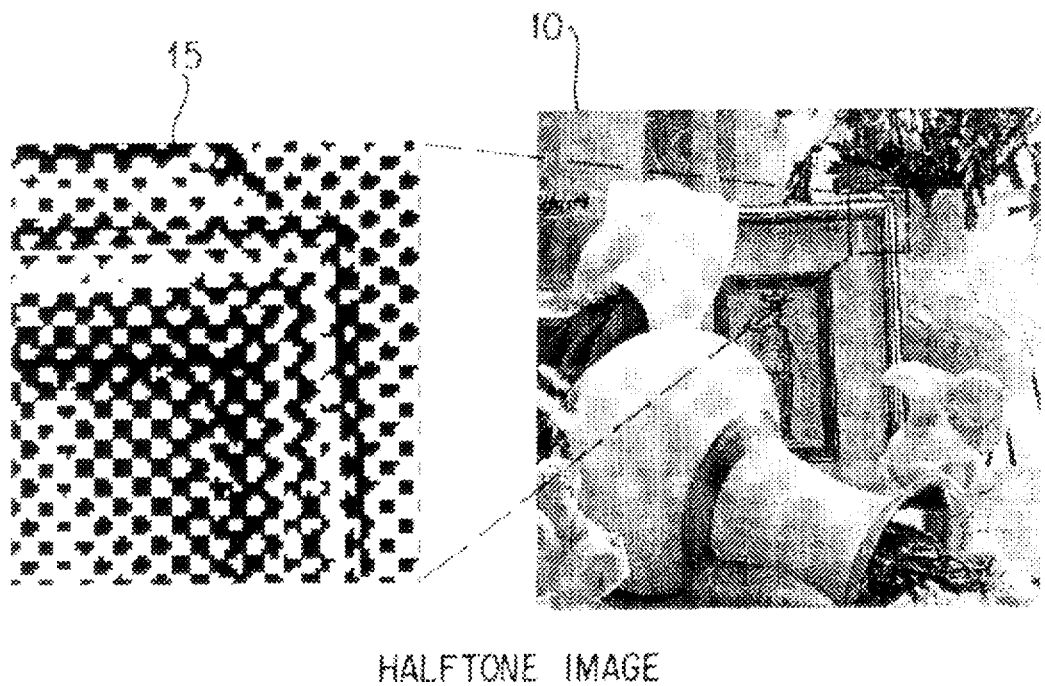
FIG. 1A shows a typical halftone image having a section enlarged.
Figure 1B:
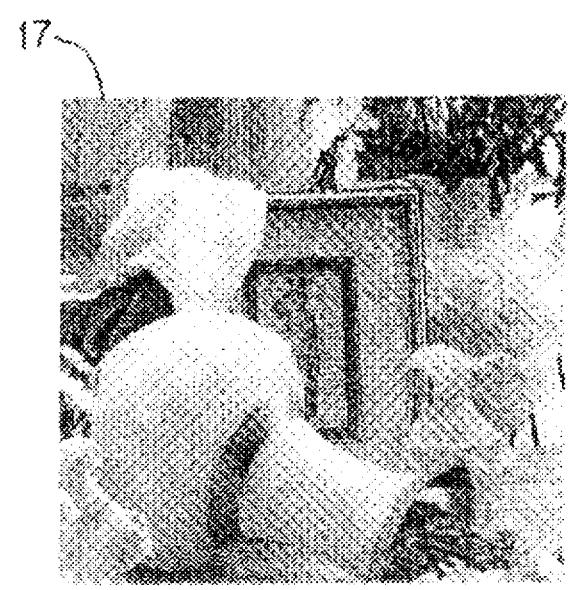
FIG. 1B shows the scanned image of the halftone image of FIG. 1A, wherein the scanned image has moire patterns.
Figure 1C:
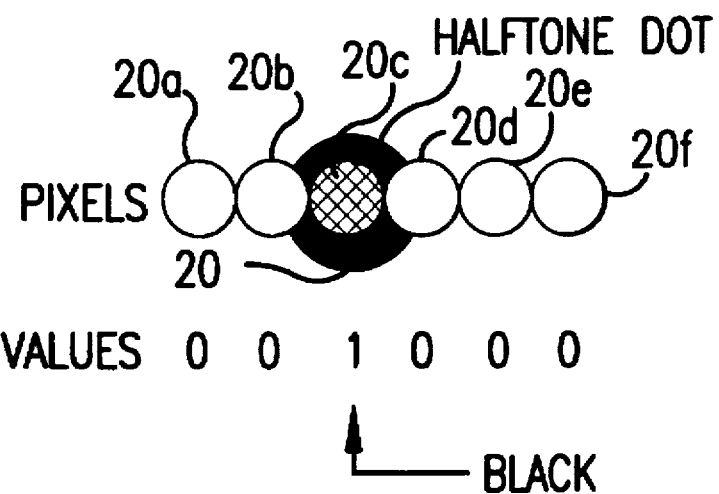
FIGS. 1C and 1D are spatial domain illustrations of the cause of the moire patterns.
Figure 1D:
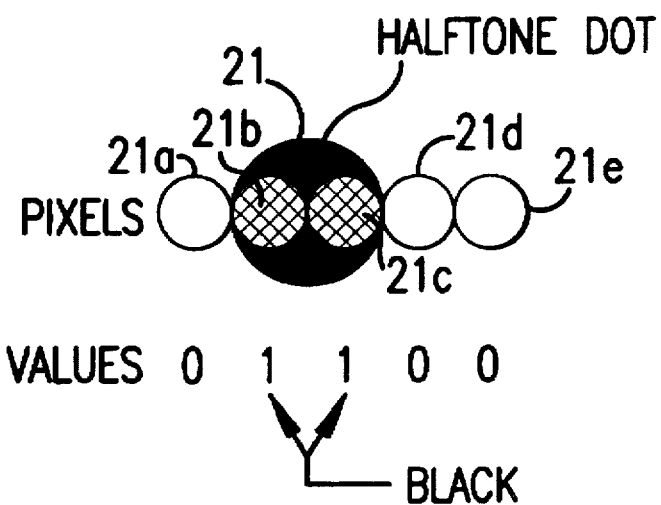
Figure 2:
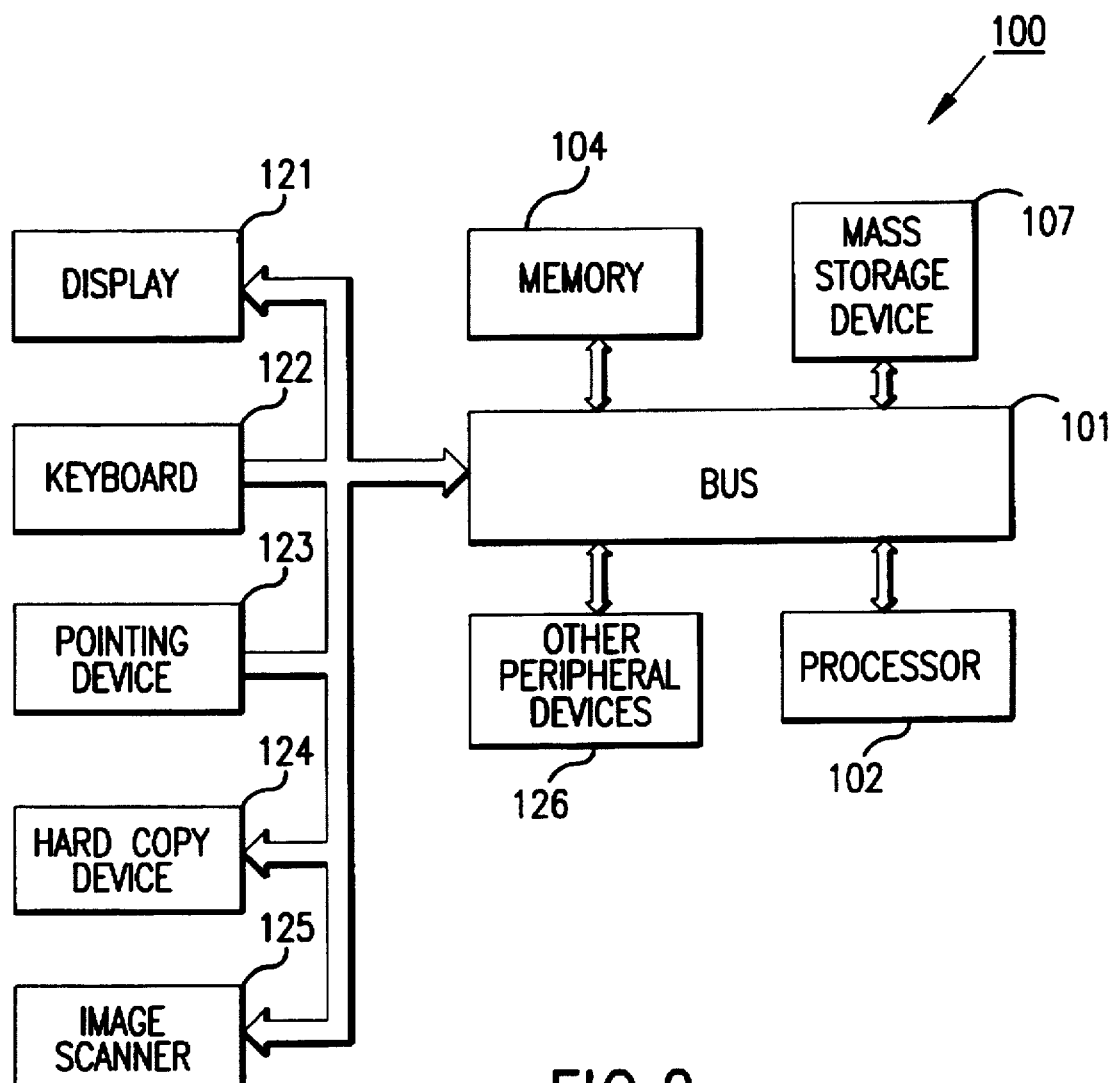
FIG. 2 shows a computer system that implements an image processing system.

FIG. 2 illustrates a computer system 100 that implements an image processing system 130 (shown in FIG. 3) within which a moire reduction module 133 (shown in FIG. 3) in accordance with one embodiment of the present invention may be implemented. Although FIG. 2 shows some of the basic components of the computer system 100, it is neither meant to be limiting nor to exclude other components or combinations of components in the system. The image processing system 130 and the moire reduction module 133 in accordance with the present invention will be described in more detail below, also in conjunction with FIGS. 3 through 10.

In one embodiment, the computer system 100 can be a personal computer, a notebook computer, a palmtop computer, a workstation, or a mainframe computer. In another embodiment, the computer system 100 can be a scan system that has some or all of the components of a computer system.

As can be seen from FIG. 2, the computer system 100 includes a bus 101 for transferring data and other information. The computer system 100 also includes a processor 102 coupled to the bus 101 for processing data and instructions. The processor 102 can be any known and commercially available processor or microprocessor. A memory 104 is also provided in the computer system 100. The memory 104 is connected to the bus 101 and typically stores information and instructions to be executed by the processor 102. The memory 104 may also include a frame buffer (not shown in FIG. 2) that stores a frame of bitmap image to be displayed on a display 121 of the computer system 100.

The memory 104 can be implemented by various types of memories. For example, the memory 104 can be implemented by a RAM (Random Access Memory) and/or a nonvolatile memory. In addition, the memory 104 can be implemented by a combination of a RAM, a ROM (Read Only Memory), and/or an electrically erasable and programmable nonvolatile memory.

The computer system 100 also includes a mass storage device 107 connected to the bus 101. The mass storage device 107 stores data and other information. In addition, the mass storage device 107 stores system and application programs. The programs are executed by the processor 102 and need to be downloaded to the memory 104 before being executed by the processor 102.

The display 121 is coupled to the bus 101 for displaying information to a user of the computer system 100. A keyboard or keypad input device 122 is also provided that is connected to the bus 101. An additional input device of the computer system 100 is a cursor control device 123, such as a mouse, a trackball, a trackpad, or a cursor direction key. The cursor control device 123 is also connected to the bus 101 for communicating direction information and command selections to the processor 102, and for controlling cursor movement on the display 121. Another device which may also be included in the computer system 100 is a hard copy device 124. The hard copy device 124 is used in the computer system 100 to print text and/or image information on a medium such as paper, film, or similar types of media.

In addition, the computer system 100 includes an image scanner 125. The image scanner 125 is used to convert an original document 140 (shown in FIG. 3) into a digitized image which can be further processed by the computer system 100. The original document 140 is the original physical document that contains picture and/or text. The original document 140 may include halftone images, continuous tone images, and text images.

In one embodiment, the image scanner 125 is a fax machine-type image scanner that has a scan region of one scan line wide. The length of the scan region is the width of the scan line. In this case, the scan head of the image scanner 125 simultaneously images the entire scan line. A document feed mechanism is provided to advance the original document 140 after each scan. In another embodiment, the image scanner 125 is a copier-type image scanner that has a relatively large scan region. For this type of scanner, the original document 140 is placed against the scan window of the scanner and the scan head of the scanner moves in one direction after each scan.

The computer system 100 also includes other peripheral devices 126. These other devices 126 may include a digital signal processor, a MODEM (modulation/demodulation), and/or a CD-ROM drive. In addition, the computer system 100 may function without some of the above described components.

Figure 3:
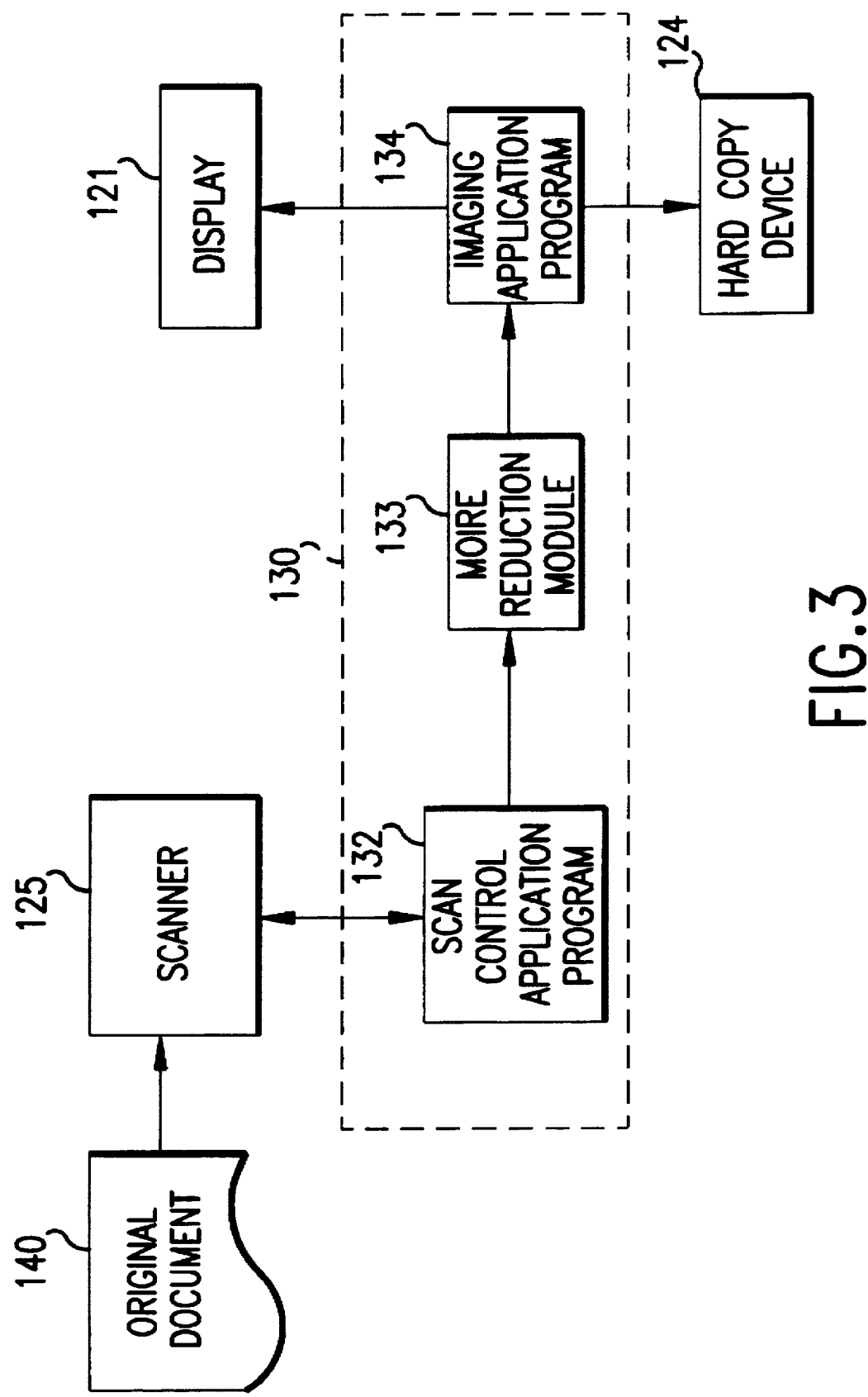
FIG. 3 shows the image processing system implemented by the computer system of FIG. 2, wherein the image processing system includes a moire reduction module in accordance with one embodiment of the present invention.
Figure 5A:
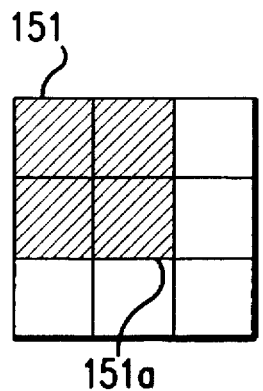
FIGS. 5A through 5F show various desired root signals (i.e., structure constraints) for the filtering processor.
Figure 5B:
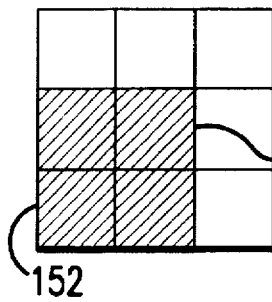
Figure 5C:
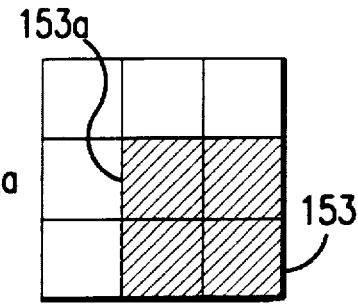
Figure 5D:
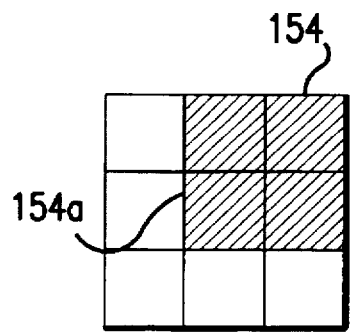
Figure 5E:
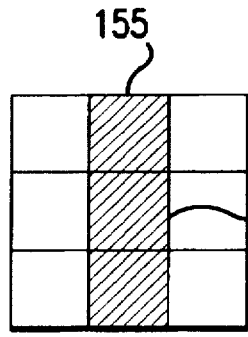
Figure 5F:
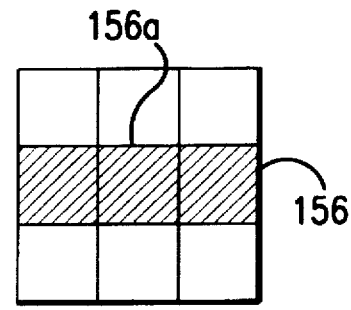

As described above, the computer system 100 includes the image processing system 130 (shown in FIG. 3) which includes the moire reduction module 133 (also shown in FIG. 3).

As can be seen from FIG. 3, the image processing system 130 includes a scan control application program 132 and an imaging application program 134, in addition to the moire reduction module 133. The programs 132 and 134 are typically stored in the mass storage device 107 of the computer system 100 (FIG. 2). These programs are loaded into the memory 104 from the mass storage device 107 before they are executed by the processor 102.

The scan control program 132 interfaces with the scanner 125. The function of scan control program 132 is to control the scanning operation of the scanner 125 and to receive the pixel data of the scanned halftone image of the original document 140 from the scanner 125. As described above, the document 140 is a halftone image document. The scan control program 132 is typically a scanner driver program for the scanner 125. In one embodiment, the scan control program 132 is the HP DeskScan application program manufactured and sold by Hewlett-Packard Company of Palo Alto, Calif. Alternatively, the scan control program 132 can be any known scanner driver program.

The scan control program 132 interfaces with the moire reduction module 133 which in turn interfaces with the imaging program 134. The imaging program 134 is used to process the scanned halftone image of the halftone image document 140 so that the scanned halftone image can be displayed on the display 121 or printed by the hard copy device 124. The imaging program 134 typically includes a device-specific image driver program. For example, the imaging program 134 can include a known display driver program or a known printer program.

In one embodiment, the imaging program 134 is the EasyPhoto imaging program manufactured and sold by Storm Technology, Inc. of Mountain View, Calif. In another embodiment, the imaging program 134 is the PhotoShop imaging program manufactured and sold by Adobe Systems, Inc. of Mountain View, Calif. Alternatively, the imaging program 134 can be any other known image processing application program.

As can be seen from FIG. 3, the moire reduction module 133 interfaces with the scan control program 132 and the imaging program 134. The moire reduction module 133 receives the pixel data of the scanned image of the original document 140 from the scan control program 132. Alternatively, the moire reduction module 133 can be a functioning module that interfaces with the imaging application program 134. In this case, the moire reduction module 133 is accessed after the pixel data has been transferred from the scan control program 132 to the imaging program 134.

As described above, the original document 140 may include halftone images, continuous tone images, and text images. Therefore, the scanned image of the document 140 may include scanned halftone images, scanned continuous tone images, and scanned text images. As also described above, moire patterns are typically introduced to the scanned halftone image of a halftone image during scanning of the halftone image.

In accordance with one embodiment of the present invention, the moire reduction module 133 first determines if a pixel of the scanned image of the document 140 appears to belong to the scanned continuous tone images. If so, the moire reduction module 133 does not process the pixel and the pixel value of the pixel is left unchanged. This causes details of the scanned continuous tone images of the scanned image of the document 140 to be preserved.

If the pixel appears not to belong to the scanned continuous tone images, the moire reduction module 133 processes the pixel using a modified median filter (i.e., the filtering processor 142 of FIGS. 4 and 8) to minimize moire patterns in the scanned halftone images of the scanned image. The filter window of the modified median filter is designed such that pixels belonging to the scanned text images of the scanned image of the document 140 are typically passed through unchanged. This allows the moire reduction module 133 to minimize the moire patterns occurred in the scanned halftone images of the scanned image without reducing the resolution of the scanned continuous tone and text images of the scanned image. This means that the moire reduction module 133 reduces the moire patterns in the scanned halftone images of the document 140 without blurring the scanned image. The moire reduction module 133 will be described in more detail below, also in conjunction with FIGS. 4–10.

Referring now to FIG. 4, the moire reduction module 133 includes a buffer 141 and the filtering processor 142 connected to the buffer 141. The buffer 141 is used to store the pixel data of the scanned image from the scan control program 132 before the pixel data are processed by the filtering processor 142. The storage capacity of the buffer 141 depends on the design of the filter window of the filtering processor 142.

In one embodiment, the storage capacity of the buffer 141 is such that allows at least three scan lines of pixel data to be stored in the buffer 141 at the same time. Alternatively, the storage capacity of the buffer 141 can be larger or smaller, depending on the design of the filtering processor 142.

In one embodiment, the filtering processor 142 employs a non-recursive filtering operation. This means that even though a new pixel value is calculated for a pixel, the original pixel value of that pixel instead of the calculated new value is used for later computations of succeeding pixels. In another embodiment, the filtering processor 142 employs a recursive filtering operation.

The filtering processor 142 can be implemented as a software program run by the processor 102 (FIG. 2) or in the form of discrete hardware or firmware. When the filtering processor 142 is implemented as a software program, the buffer 141 can be implemented by the memory 104 (FIG. 2). When the filtering processor 142 is implemented in the form of discrete hardware or firmware, the buffer 141 can be implemented by a discrete memory or memory 104.

Figures 6, 7:
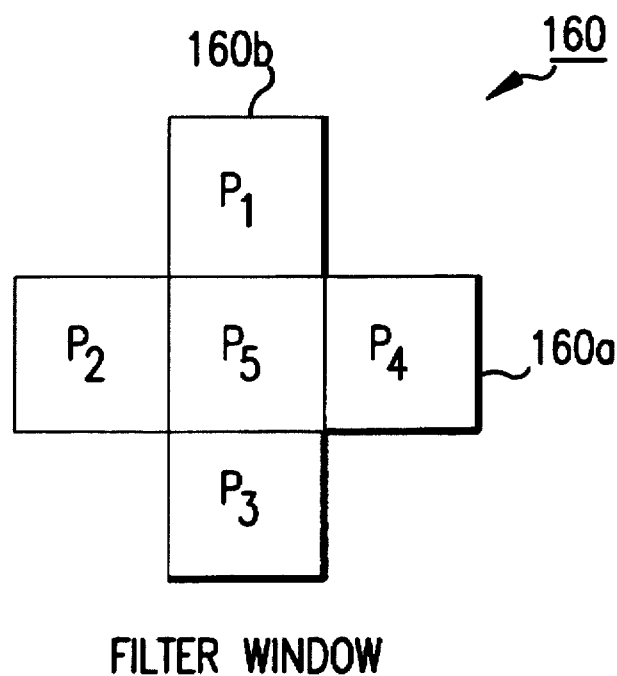
FIG. 6 shows the filter window of the filtering processor in accordance with one embodiment of the present invention, wherein the filter window allows the filtering processor of FIG. 4 to pass through the root signals of FIGS. 5A–5F unchanged.
FIG. 7 illustrates how the filtering processor of FIG. 4 uses the filter window of FIG. 6 to process the scan pixels.
Figure 8:
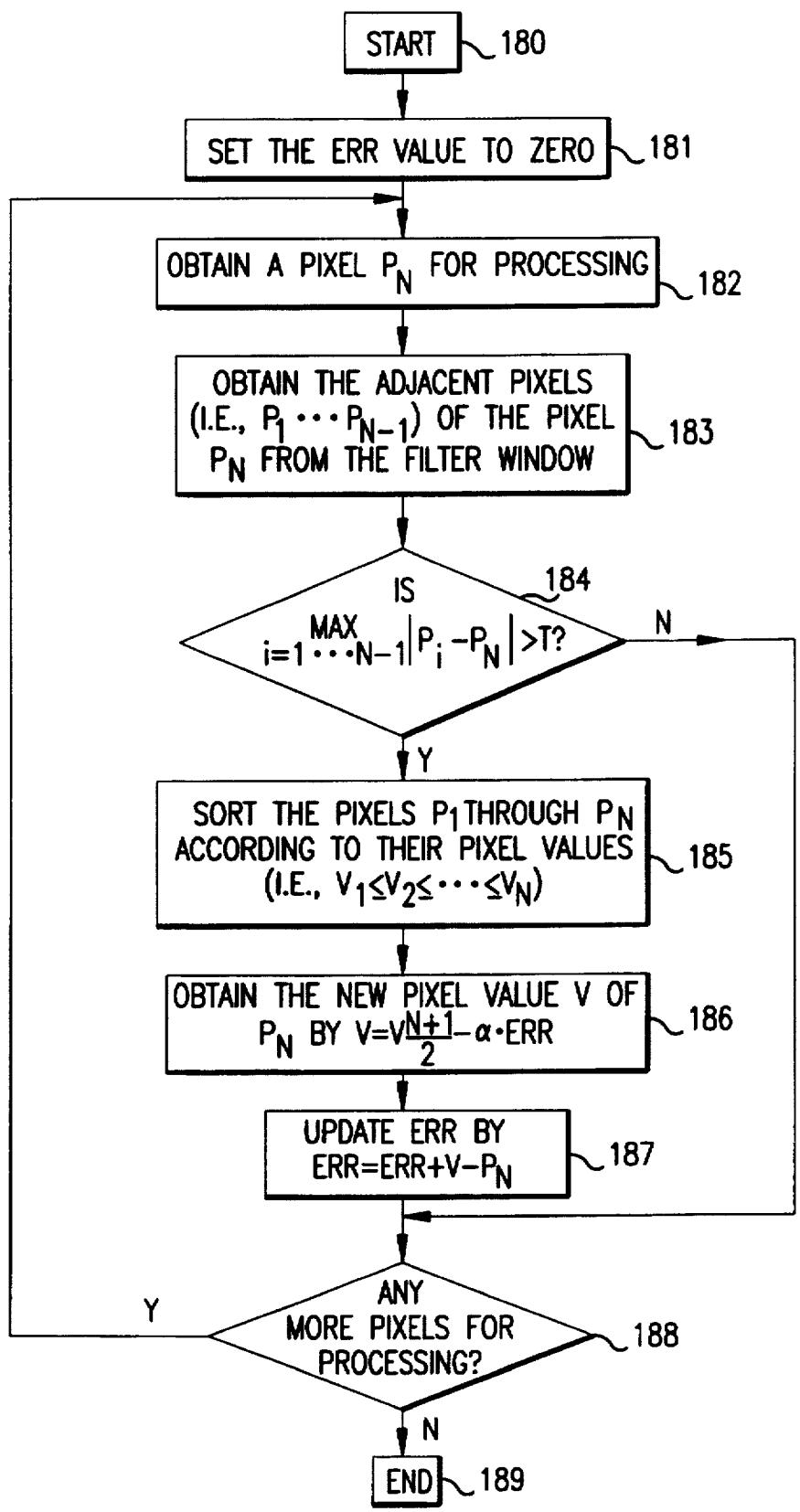
FIG. 8 shows in flow chart diagram form the operation of the filtering processor of FIG. 4.

The filtering processor 142 is used to process the pixel data of the scanned image of the document 140 (FIG. 3). Again and as described above, the scanned image of the document 140 includes scanned halftone images, scanned continuous tone images, and scanned text images. In accordance with one embodiment of the present invention, the filtering processor 142 processes the scanned halftone images of the scanned image to minimize the moire patterns in the scanned halftone images. Meanwhile, the filtering processor 142 typically leaves the pixel data of the scanned continuous tone and text images unchanged such that resolution of the scanned image of the document 140 is not reduced. The filtering processor 142 is essentially a modified median filter with a specially designed filter window (i.e., filter window 160). FIG. 6 shows the filter window 160 of the filtering processor 142, which will be described in more detail below. FIG. 8 shows the operation of the filtering processor 142, which will also be described in more detail below.

Briefly, the filtering processor 142 selects a pixel to process (hereinafter referred to as the sample pixel). Then the filtering processor 142 obtains a number of adjacent pixels of the sample pixel that fall within the filter window of the filtering processor 142. The filter window is centered at the sample pixel and is used to define which pixels are the adjacent pixels of the sample pixel that are to be used to compute a new pixel value for the sample pixel. The filtering processor 142 then determines if the sample pixel appears to belong to the scanned continuous tone images by determining if the sample pixel is similar to the selected adjacent pixels. If so, the sample pixel passes through the filtering processor 142 unchanged. If the sample pixel is significantly different from at least one adjacent pixel (i.e., the sample pixel does not appear to belong to any continuous tone image), the filtering processor 142 replaces the pixel value of the sample pixel with the pixel value of a median pixel among the adjacent pixels and the sample pixel. The filter window of the filtering processor 142 is designed such that the median pixel is the sample pixel if the sample pixel appears to belong to the scanned text features that need to be preserved. This allows the sample pixel to typically pass through the filtering processor 142 unchanged when the sample pixel belongs to the scanned text images. The median pixel is a pixel that has a center pixel value among a number of pixels when the number of pixels are arranged or sorted in an ascending order. The pixel value of the median pixel is hereinafter referred to as the median pixel value.

The shape and size of the filter window of the filtering processor 142 determines which signals or pixels can pass through the filtering processor 142 unchanged (i.e., root signals). FIG. 6 shows the shape and size of the filter window 160 of the filtering processor 142 that passes through the scanned text image pixels unchanged in accordance with one embodiment of the present invention, which will be described in more detail below.

In one embodiment, the size of the filter window of the filtering processor 142 is three pixels long and three pixels wide. This allows the filtering processor 142 to require modest computation and memory space while the desired structural constraints of the filtering processor 142 can still be obeyed. Alternatively, the filter window of the filtering processor 142 can be larger or smaller than 3×3 pixels.

As is known, a median filter preserves its root signals. This means that the median filter does not filter out certain signals or image features when filtering out impulsive signals. The root signals can also be referred to as the structural constraints of the median filter.

As described above, the filtering processor 142 is a modified median filter that minimizes the moire patterns in the scanned halftone image of the document 140 (FIG. 3) without reducing the image resolution of the scanned continuous tone and text images of the document 140. This means that the filtering processor 142 needs to pass pixel data of text, lines, and edges of the scanned image unchanged. Therefore, the desired structural constraints (i.e., root signals) of the filtering processor 142 should include straight lines (e.g., horizontal and vertical lines).

In addition, the desired structural constraints of the filtering processor 142 should also include corners in order to produce sharp text. The reason the corners and straight lines are selected as the desired root signals for the filtering processor 142 is that those elements are most common in text and line drawings. In addition, human vision tends to be slightly more sensitive in horizontal and vertical directions. FIGS. 5A through 5F show some of the desired structural constraints for the filtering processor 142 of FIG. 4. It is to be noted that any filter that contains the signals of FIGS. 5A–5F as root signals will also contain horizontal and vertical edges as root signals. It is, however, to be appreciated that the desired root signals of the filtering processor 142 may include other types of image features. For example, the root signals may include diagonal lines and/or edges.

As can be seen from FIGS. 5A–5F, each of the root signals 151 through 156 is shown within a 3×3 pixel window. For each of those root signals 151–156, the pixel value of the respective center pixel (i.e., the pixel 151a, 152a, 153a, 154a, 155a, or 156a) can not be changed when passing through the filtering processor 142 (FIG. 4) in order to preserve the respective root signal. This means that, for example, if the filtering processor 142 of FIG. 4 learns that the received pixel is the pixel 151a, the filtering processor 142 passes the pixel 151a unchanged because the pixel 151a belongs to the root signal 151.

Referring back to FIG. 4, in order for the filtering processor 142 to preserve the root signals 151–156 (FIGS. 5A–5F), the filter window of the filtering processor 142 needs be shaped such that the filtering processor 142 can pass through the root signals 151–156 (FIGS. 5A–5F) unchanged. In accordance with one embodiment of the present invention, the filter window of the filtering processor 142 is the cross-shaped five-pixel filter window 160, as shown in FIG. 6. As can be seen from FIG. 6, the filter window 160 has a horizontal pixel window 160a and a vertical pixel window 160b intersecting the horizontal pixel window 160a to form the cross-shaped filter window 160. By having the cross-shaped filter window 160, the median pixel calculated by the filtering processor 142 of FIG. 4 is always the center pixel $P_5$ for those root signals 151–156 (FIGS. 5A–5F). This means that the filtering processor 142 does not change the pixel value of the center pixel $P_5$ of the filter window 160 if the center pixel belongs to one of the root signals 151–156. In addition, the cross-shaped filter window 160 also minimizes computation and memory requirement of the filtering processor 142 of FIG. 4. The center pixel $P_5$ in the filter window 160 is the pixel that needs to have its value calculated by the filtering processor 142, using the pixel within the cross-shaped filter window 160.

Alternatively, the filter window of the filtering processor 142 can have other shapes. For example, the filter window of the filtering processor 142 can have a 3×3 weighted filter window, where the center pixel within the window has a weight of three units while each of the other eight pixels has only one unit weight. Moreover, the shape of the filter window 160 (FIG. 6) can be an "X" shape in order to reproduce diagonal structures.

However, as can be seen from FIG. 6, the cross-shaped filter window 160 causes the filtering processor 142 (FIG. 4) to require minimized computation because there are only five pixel values within the window 160 for median calculations. This has the advantage over other types of 3×3 pixel windows (e.g., the 3×3 weighted pixel window).

FIG. 7 shows how the cross-shaped filter window 160 of FIG. 6 is slid through pixels of the scanned halftone image. As can be seen from FIG. 7, three scan lines (i.e., scan lines 161–163) of pixels are shown. When the pixel $q_7$ is to be processed, the cross-shaped filter window 160 of FIG. 6 places the $q_7$ pixel at its center and selects the pixels $q_2$, $q_6$, $q_8$, and $q_{12}$ for processing. Then the cross-shaped filter window 160 is slid to place the pixel $q_8$ as the center pixel of the filter window. In this case, the filter window 160 selects the pixels $q_3$, $q_7$, $q_9$, and $q_{13}$. The filter window 160 then continues until the end of the scan line 162 is reached.

The operation of the filtering processor 142 of FIG. 4 is now described in more detail, in conjunction with FIGS. 6 and 8. As can be seen from FIG. 8, the operation starts at step 180. At Step 181, a variable ERR is set to zero. The variable ERR is the running total over the image of the difference between the output pixel values and the corresponding input pixel values. At step 182, a pixel $P_N$ is received for processing. The $P_N$ pixel is the pixel $P_5$ shown in FIG. 6. Then step 183 is performed at which the filtering processor 142 (FIG. 4) determines the adjacent pixels $P_1$ through $P_{N-1}$ of the $P_N$ pixel (i.e., the $P_1$ through $P_4$ pixels) based on the cross-shaped filter window 160. At step 184, the filtering processor 142 determines if the absolute difference between the pixel value of any one of the $P_1$ through $P_4$ pixels and that of the $P_5$ pixel is greater than a predetermined value T. The effect of this step is to determine if the $P_5$ pixel appears to belong to the scanned continuous tone images of the scanned image. The filtering processor 142 (FIG. 4) determines if the $P_5$ pixel appears to belong to the scanned continuous tone images of the scanned image by determining if the $P_5$ pixel is similar to its adjacent pixels $P_1$ through $P_4$.

The predetermined value T determines the level or threshold at which the filtering processor 142 starts to process the pixels to reduce the moire patterns on the scanned halftone image. Larger T values cause too many moire artifacts or patterns to pass through the filtering procesor 142 unchanged, while smaller T values remove some of the fine details of the scanned continuous tone image, making the image more blurred.

In one embodiment, each pixel value supplied to the filtering processor 142 is represented by an 8-bit image data. In this case, each pixel of the scanned halftone image can take on any value between zero and two hundred fifty five (i.e., 255), with the lowest value representing the darkest pixel. For this type of data, the T value can be selected from zero to two hundred fifty-five.

However, it has been found that when the T value is selected to be approximately twenty, considerable moire reduction can be achieved by the filtering processor 142 while retaining high resolution details of the scanned continuous tone image.

In one embodiment, the T value is selected to be twenty. In other embodiments, the T value can be larger or smaller than twenty.

If, at step 184, it is determined that the pixel value of at least one of the $P_1$ through $P_4$ pixels is different from that of the $P_5$ pixel by more than the predetermined value T, then step 185 is performed. If not, steps 185–187 are skipped.

At step 185, the pixels $P_1$ through $P_5$ are sorted and arranged according to their pixel values. This means if, for example, $P_2 \geq P_3 \geq P_1 \geq P_5 \geq P_4$ is true, these pixels will be arranged in that order. Here $V_N$ equals $P_2$ and $V_1$ equals $P_4$. Then at step 186, the new pixel value V of the $P_5$ pixel is obtained in accordance with the equation $$V = V_{(N+1)/2} - \alpha \times ERR$$

Here $V_{(N+1)/2}$ represents the median pixel of the sorted pixels $P_1$ through $P_5$. The steps 185 and 186 represent the median filtering operation of the filtering processor 142.

As described above, the filter window 160 of FIG. 6 allows the filtering processor 142 to pass pixels that appear to belong to the scanned text images (i.e., the root signals 151–156) unchanged when processing the pixels of the scanned halftone images to minimize the moire patterns. Therefore, if the $P_5$ pixel appears to belong to a scanned text image (i.e., belongs to one of the root signals 151–156 of FIGS. 5A–5F), the median pixel $V_{(N+1)/2}$ is calculated to be the $P_5$ pixel at steps 185 and 186 due to the cross-shaped filter window 160 of the filtering processor 142. This thus retains details of the scanned text images of the scanned image of the document 140 by the filtering processor 142 (FIG. 4).

Then step 187 is performed to update the variable ERR. Then step 188 is performed to determine if there are any more pixels of the scanned image to be processed. If so, step 182 is repeated. Otherwise, the operation ends at step 189. Pixels are typically processed in raster order, where each scanned image row is processed from left to right and the rows are processed in order from top to bottom.

Figure 9:
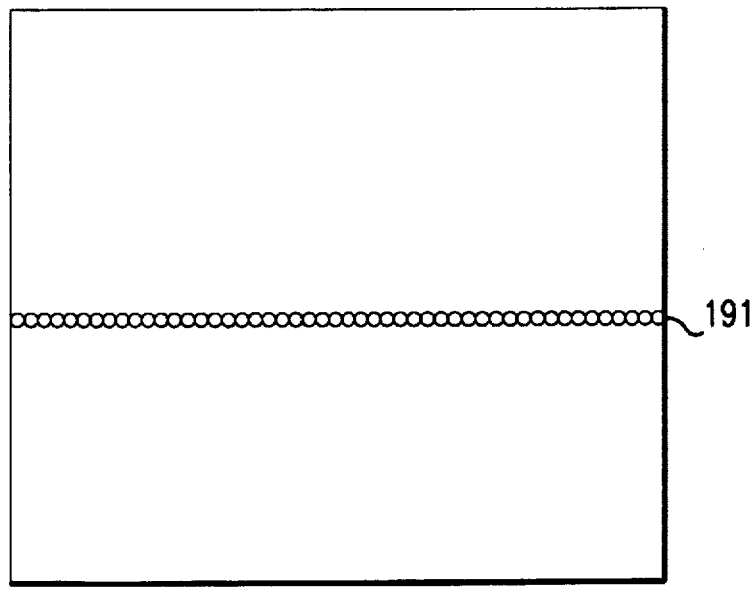
FIG. 9 shows a synthetic image used to illustrate the effect of the parameter $\alpha$ used in the filtering processor of FIGS. 4 and 8.
Figure 10:
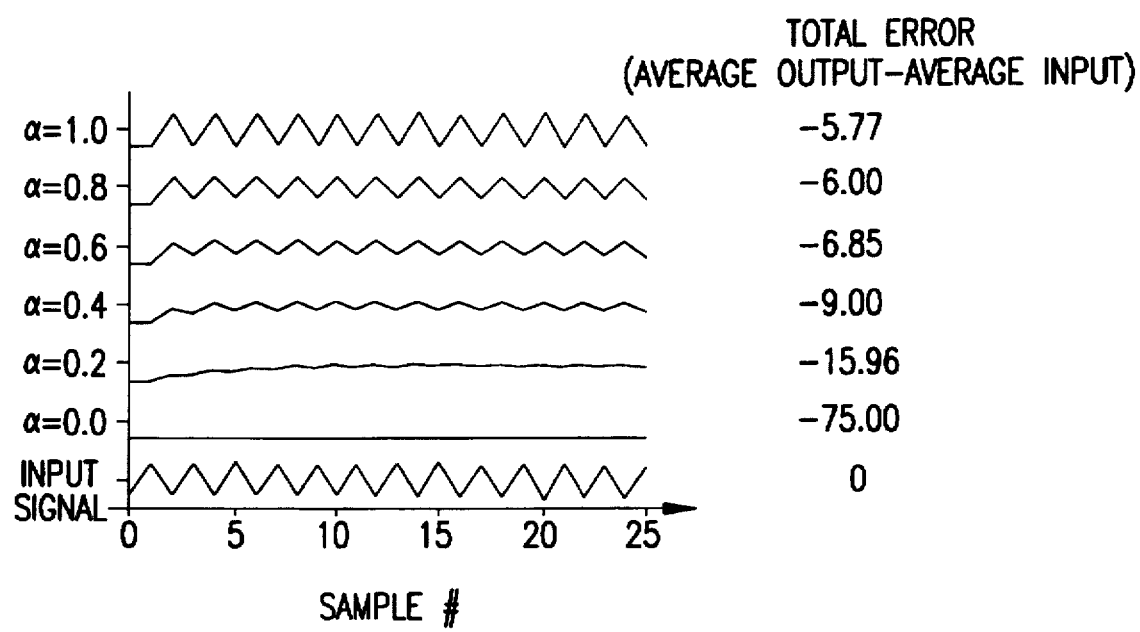
FIG. 10 shows different outputs of the synthetic image of FIG. 9 from the filtering processor of FIG. 4 as the parameter $\alpha$ is varied from zero to one.

As described above, the parameter a should be chosen to ensure that the local pixel average of the output image from the filtering processor 142 stays close to the local average of the scanned halftone images. This feeding forward of the error allows periodic dot structures more than three pixels apart to be smoothed somewhat even though the filter window 160 (FIG. 6) of the filtering processor 142 (FIG. 4) is only three pixels long and three pixels wide. The parameter $\alpha$ is selected between zero and one. This is because $\alpha$ values greater than one typically cause the filtering processor 142 to increase high frequency moire patterns rather than reducing them, while $\alpha$ values less than zero make the filtering processor 142 unstable in the sense that the output can become unbounded for a bounded input signal. For $\alpha$ value that is between zero and one, a smaller $\alpha$ value causes the filtering processor 142 to perform the most smoothing but will produce the most error between the average input value and the average output value. Larger $\alpha$ values cause the filtering processor 142 to preserve the average gray level with more accuracy, but will cause the filtering processor 142 not to filter out much of the high frequency moire patterns. Larger $\alpha$ values will also cause the filtering processor 142 to adjust more rapidly to changing data statistics than small $\alpha$ values. FIG. 9 shows a synthetic image 190 to illustrate more precisely the effect of the parameter $\alpha$ on the output of the filtering processor 142 of FIG. 4. FIG. 10 shows the effect of varying $\alpha$ on the image of FIG. 9.

As can be seen from FIG. 9, the synthetic image 190 has a constant gray value of 50 with the exception of one row (i.e., the row 191). For the row 191, every other pixel value is 200 (i.e., substantially white). When this image 190 is used as the input signal to the filtering processor 142, the waveform of that input signal is shown in FIG. 10 (i.e., the input signal). In this case, only the non-constant row 191 will be changed. FIG. 10 shows how the output row of the non constant row 191 (FIG. 9) varies due to different $\alpha$ values. As can be seen from FIG. 10, when the $\alpha$ value equals zero, the filtering processor 142 of FIG. 4 does not have any forward feeding. When the $\alpha$ value equals one, the filtering processor 142 feeds the entire row forward and simply reproduces the row 191 shifted to the right by one pixel. As can be seen from FIG. 10, when $\alpha$ is approximately equal to 0.25, good output results can be obtained. This is also true for most images.

The moire reduction module 133 (FIG. 3) as described thus far is for processing monochrome image data. This, however, can be easily extended to process color images as well. One way of extending the moire reduction module 133 to process color images is to simply apply the module 133 to each scanned color plane separately. Another way of doing this is to transform the color image from the red-green-blue color combination to a luminance-chrominance color domain and operate on one or more transformed color planes.

In the foregoing specification, the invention has been described with reference to specific embodiments thereof. It will, however, be evident to those skilled in the art that various modifications and changes may be made thereto without departing from the broader spirit and scope of the invention. Therefore, the invention is not limited to the specific embodiments described and illustrated.

What is claimed is:

1. A method of processing a scanned image having a scanned halftone image and a scanned text image, comprising the steps of:

(A) providing a filter window for a modified median filter that allows the modified median filter to pass through image pixels of the scanned text image substantially unchanged while reducing moire pattern in the scanned halftone image, wherein the filter window is a cross-shaped window that has a horizontal pixel window and a vertical pixel window intersecting the horizontal pixel window;

(B) using the modified median filter to receive image pixels of both the scanned halftone image and the scanned text image and to process the image pixels of the scanned image such that moire pattern in the scanned halftone image is minimized while the resolution of the scanned text image is retained.

2. The method of claim 1, wherein each of the horizontal and vertical pixel windows has a window span of three image pixels.

3. A method of processing a scanned image having a scanned halftone image, a scanned text image, and a scanned continuous tone image, comprising the steps of:

(A) providing a modified median filter having a cross-shaped filter window that allows the modified median filter to pass through image pixels of the scanned text image substantially unchanged while reducing moire pattern in the scanned halftone image;

(B) determining if an image pixel of the scanned image appears to belong to the scanned continuous tone image;

(C) if the image pixel appears to belong to the scanned continuous tone image, then not processing the image pixel using the modified median filter;

(D) if the image pixel does not appear to belong to the scanned continuous tone image, then sending the image pixel and a number of adjacent pixels that fall within the cross-shaped filter window to the modified median filter such that moire pattern in the scanned halftone image is minimized without reducing the resolution of the scanned image.

4. The method of claim 3, wherein the step (B) is performed by determining if the pixel value of the image pixel is different from that of at least one of the adjacent pixels by more than a predetermined value.

5. The method of claim 4, wherein the predetermined value is twenty while the pixel value of each image pixel of the scanned image can range from zero to two hundred fifty five.

6. The method of claim 3, wherein the step (D) further comprises the steps of (I) determining which one of the adjacent pixels and the image pixel has the median pixel value, wherein when the image pixel appears to belong to the scanned text image, the image pixel has the median pixel value;

(II) subtracting an error value multiplied by a predetermined parameter from the median pixel value, wherein the error value is initially set at zero;

(III) changing the pixel value of the image pixel to the subtracted median pixel value;

(IV) updating the error value for a next image pixel by adding the difference between the original pixel value of the image pixel and the subtracted median pixel value to the error value.

7. The method of claim 6, wherein the predetermined parameter is selected from a range of a 0.2 to 0.4.

8. The method of claim 7, wherein the predetermined parameter is 0.25.

9. The method of claim 3, further comprising the steps of (E) determining if the scanned halftone image has at least one more unprocessed image pixel;

(F) if the scanned halftone image is determined to have at least one more unprocessed image pixel, then returning to the step (B).

10. An image processing apparatus for a scanned image having a scanned halftone image and a scanned text image, comprising:

(A) a modified median filter having a filter window that allows the modified median filter to pass through image pixels of the scanned text image substantially unchanged when the modified median filter minimizes moire pattern in the scanned halftone image such that the moire pattern is minimized without reducing the resolution of the scanned image, wherein the filter window is a cross-shaped filter window that has a horizontal pixel window and a vertical pixel window intersecting the horizontal pixel window.

11. The image processing apparatus of claim 10, wherein each of the horizontal and vertical pixel windows has a window span of three image pixels.

12. The image processing apparatus of claim 10, wherein the modified median filter is a digital non-recursive filter.

13. The image processing apparatus of claim 10, wherein the modified median filter is a digital recursive filter.

14. An image processing apparatus for a scanned image having a scanned halftone image, a scanned text image, and a scanned continuous tone image, comprising:

(A) a first set of instructions that define a cross-shaped filter window for a modified median filter, wherein the cross-shaped filter window allows the modified median filter to pass through image pixels of the scanned text image substantially unchanged while reducing moire pattern in the scanned halftone image;

(B) a second set of instructions that determine if an image pixel of the scanned image appears to belong to the scanned continuous tone image;

(C) a third set of instructions that pass through the image pixel unchanged if the image pixel appears to belong to the scanned continuous tone image;

(D) a fourth set of instructions that send the image pixel and a number of adjacent pixels that fall within the cross-shaped filter window to the modified median filter if the image pixel does not appear to belong to the scanned continuous tone image such that moire pattern in the scanned halftone image is minimized without reducing the resolution of the scanned image.

15. The image processing apparatus of claim 14, wherein the second set of instructions determine if the image pixel appears to belong to the scanned continuous tone image by determining if the pixel value of the image pixel is different from that of at least one of the adjacent pixels by more than a predetermined value.

16. The image processing apparatus of claim 15, wherein the predetermined value is twenty while the pixel value of each image pixel of the scanned image can range from zero to two hundred fifty five.

17. The image processing apparatus of claim 14, wherein the fourth set of instructions further comprises (I) a first subset of instructions that determine which one of the adjacent pixels and the image pixel has the median pixel value, wherein when the image pixel belongs to the scanned text image, the image pixel has the median pixel value;

(II) a second subset of instructions that subtract an error value multiplied by a predetermined parameter from the median pixel value, wherein the error value is initially set at zero;

(III) a third subset of instructions that change the pixel value of the image pixel to the subtracted median pixel value;

(IV) a fourth subset of instructions that update the error value for a next image pixel by adding the difference between the original pixel value of the image pixel and the subtracted median pixel value to the error value.

18. The image processing apparatus of claim 17, wherein the predetermined parameter is selected from a range of 0.2 to 0.4.

19. The image processing apparatus of claim 18, wherein the predetermined parameter is 0.25.

20. The image processing apparatus of claim 14, wherein the cross-shaped filter window has a horizontal pixel window and a vertical pixel window intersecting the horizontal pixel window, wherein each of the horizontal and vertical pixel windows has a window span of three image pixels.

* * * * *